US012529506B2

(12) United States Patent
Wantland

(10) Patent No.: US 12,529,506 B2
(45) Date of Patent: Jan. 20, 2026

(54) DOOR-IN-DOOR COMMON AXIS HINGE ASSEMBLY WITH DOOR STOPS

(71) Applicant: Haier US Appliance Solutions, Inc., Wilmington, DE (US)

(72) Inventor: Louis A. Wantland, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 204 days.

(21) Appl. No.: 18/472,341

(22) Filed: Sep. 22, 2023

(65) Prior Publication Data

US 2025/0102217 A1 Mar. 27, 2025

(51) Int. Cl.
*F25D 23/02* (2006.01)
*E05D 3/02* (2006.01)
*E05D 11/06* (2006.01)
*E05D 11/10* (2006.01)

(52) U.S. Cl.
CPC ............. *F25D 23/028* (2013.01); *E05D 3/02* (2013.01); *E05D 11/06* (2013.01); *E05D 11/10* (2013.01); *E05Y 2900/31* (2013.01); *F25D 2323/024* (2013.01)

(58) Field of Classification Search
CPC ............. F25D 2323/024; F25D 23/028; F25D 2323/023; E05D 11/06; E05D 11/105; E05D 11/10; E05D 3/02; E05Y 2900/31; E05Y 2201/224; E05Y 2201/638
See application file for complete search history.

(56) References Cited

U.S. PATENT DOCUMENTS

| | | | | |
|---|---|---|---|---|
| 2,150,064 | A | 3/1939 | Robert et al. | |
| 8,388,078 | B2 | 3/2013 | Kwon et al. | |
| 8,424,985 | B2 | 4/2013 | Kwon et al. | |
| 8,544,973 | B2 | 10/2013 | Kwon et al. | |
| 9,170,045 | B2 | 10/2015 | Oh et al. | |
| 9,175,901 | B2 | 11/2015 | Oh et al. | |
| 9,568,238 | B2 | 2/2017 | Kim et al. | |
| 10,400,491 | B2 | 9/2019 | Fleig et al. | |
| 10,458,164 | B2 | 10/2019 | Wantland et al. | |
| RE48,733 | E | 9/2021 | Oh et al. | |
| 11,578,519 | B2 | 2/2023 | Park et al. | |
| 12,421,776 | B2 * | 9/2025 | Wantland | E05D 3/04 |
| 2012/0286639 | A1 * | 11/2012 | Lee | F25D 23/12 312/405.1 |

(Continued)

FOREIGN PATENT DOCUMENTS

| | | | | |
|---|---|---|---|---|
| CN | 102252491 A | * 11/2011 | | F25D 23/025 |
| CN | 105546912 A | * 5/2016 | | E05D 7/081 |

(Continued)

*Primary Examiner* — Hiwot E Tefera
(74) *Attorney, Agent, or Firm* — Dority & Manning, P.A.

(57) ABSTRACT

A refrigerator appliance includes a door-in-door assembly having a single axis of rotation for the inner and outer doors. The inner and outer doors have separate rotation stops to limit the rotation of the doors from a closed position to an open position. The outer door stop is fixed to the inner door and contacts a first tab that rotates with the outer door. The inner door stop is fixed to the cabinet and contacts a second tab that rotates with the inner door. The outer door rotation angle is less than the inner door rotation angle.

14 Claims, 5 Drawing Sheets

(56) References Cited

U.S. PATENT DOCUMENTS

| | | | | |
|---|---|---|---|---|
| 2015/0260447 | A1* | 9/2015 | Kim | F25D 27/005 312/405 |
| 2020/0025438 | A1* | 1/2020 | Liu | F25D 23/025 |
| 2024/0044569 | A1* | 2/2024 | Dong | F25D 23/025 |
| 2024/0044570 | A1* | 2/2024 | Dong | F25D 23/025 |
| 2025/0027350 | A1* | 1/2025 | Wantland | E05D 11/0081 |

FOREIGN PATENT DOCUMENTS

| | | | | | |
|---|---|---|---|---|---|
| CN | 110874882 | A | * | 3/2020 | G07F 9/10 |
| CN | 213898574 | U | | 8/2021 | |
| CN | 113482472 | B | | 1/2023 | |
| CN | 218347162 | U | | 1/2023 | |
| CN | 218495577 | U | | 2/2023 | |
| KR | 20220085384 | A | * | 6/2022 | F25D 23/025 |
| WO | WO-0171264 | A1 | * | 9/2001 | F25D 23/028 |
| WO | WO2022131678 | A1 | | 6/2022 | |
| WO | WO2022268161 | A1 | | 12/2022 | |
| WO | WO2022268163 | A1 | | 12/2022 | |

* cited by examiner

DOOR-IN-DOOR COMMON AXIS HINGE ASSEMBLY WITH DOOR STOPS

FIELD OF THE INVENTION

The subject matter of the present disclosure relates generally to door-in-door refrigerator appliances. In particular, the present subject matter relates to door stops for door-in-door refrigerator appliances having a common axis of rotation.

BACKGROUND OF THE INVENTION

Refrigerator appliances generally include a cabinet that defines a food storage chamber. In addition, refrigerator appliances also generally include a door rotatably hinged to the cabinet to permit selective access to food items stored in the fresh food storage chamber. Certain refrigerator appliances, commonly referred to as door-in-door refrigerator appliances, may include a inner door forming a food storage chamber positioned within the door and selectively accessible through an outer door rotatably hinged to the inner door. Alternatively, the outer door may be securely latched to the inner door in the closed position and the inner door and outer door may be rotated together as a full door to provide access to the fresh food storage chamber.

In door-in-door systems with a common axis of rotation for the outer door and the inner door, control of the rotation for each door may be desirable. In many cases, the outer door rotating separately from the inner door may over-rotate and contact the inner door, potentially damaging the appliance. Additionally, the inner door and outer door rotating together may contact adjacent structures or appliance, potentially causing damage. Accordingly, control of the maximum rotation for the outer door and the outer door coupled to the inner door may be beneficial. However, if rotation of the outer door and the inner door are limited to the same degree, the limit to the full door rotation may prevent full width access to the fresh food storage chamber. Accordingly, a door-in-door common axis arrangement in which rotation of the outer door and the inner door are separately limited may be desirable.

BRIEF DESCRIPTION OF THE INVENTION

Aspects and advantages of the invention will be set forth in part in the following description, may be apparent from the description, or may be learned through practice of the invention.

In one exemplary aspect, a refrigerator appliance defining a vertical direction, a lateral direction, and a transverse direction, the vertical, lateral, and transverse directions being mutually perpendicular, is presented. The refrigerator appliance comprises a cabinet defining a fresh food storage chamber, a front portion of the fresh food storage chamber defining an opening, and a door-in-door assembly mounted at the front portion of the fresh food storage chamber. The door-in-door assembly comprises an inner door including a first stop protruding from a door edge, an outer door; and a hinge assembly. The hinge assembly comprises a cabinet plate comprising a first surface and a second surface defining a thickness, a first end defining a first aperture through the thickness, and a second end fixedly mounted to the cabinet, a door plate comprising a first surface and a second surface defining a thickness, a first end defining a second aperture through the thickness, and a second end fixedly mounted to the outer door. Wherein the inner door is rotatably mounted to the cabinet plate about a pivot axis and the door plate is rotatably mounted to the inner door about the pivot axis, the pivot passing through the first and second apertures, and further wherein a first tab of the door plate abuts the first stop on the inner door at a maximum outer door rotation angle, and a second tab of the door plate abuts a second stop on the cabinet plate at a maximum inner door rotation angle.

In another exemplary aspect, a hinge assembly for a door-in-door refrigerator appliance door is presented. The hinge assembly comprises a cabinet plate comprising a first surface and a generally parallel second surface defining a thickness and a first aperture formed through the thickness, the cabinet plate comprising a second stop, a door plate comprising a first surface and a generally parallel second surface defining a thickness and a second aperture formed through the thickness, the door plate comprising a first tab extending from the thickness generally aligned with the first and second surfaces, and a second tab extending from the first surface and generally perpendicular to the first surface, and a pivot passing through the first and second apertures, the pivot supporting the door plate in rotation about the cabinet plate, wherein rotation of the door plate about the cabinet plate is limited by the second tab of the door plate abutting the second stop on the cabinet plate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
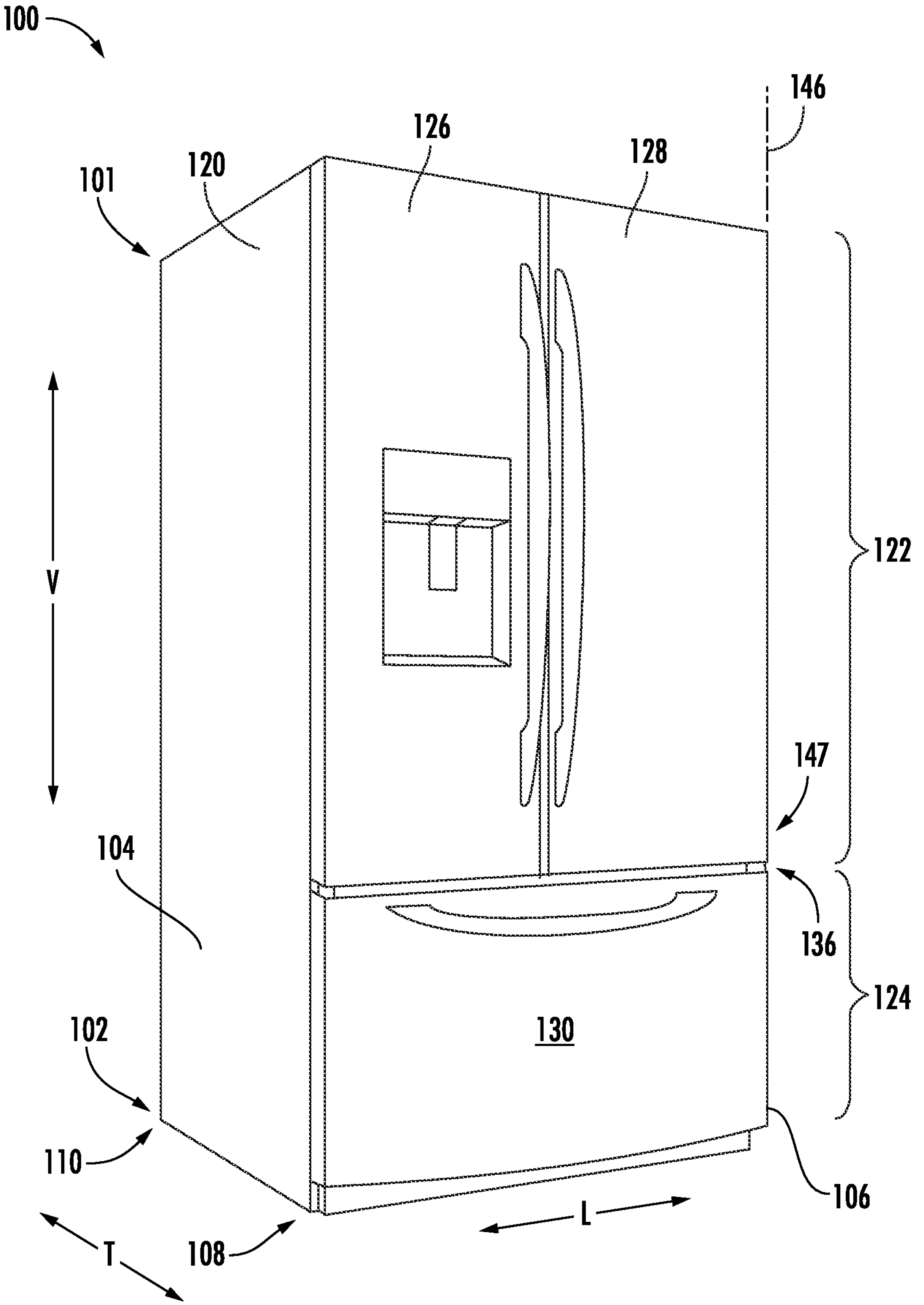
FIG. 1 provides a perspective view of a refrigerator appliance according to exemplary embodiments of the present disclosure with refrigerator doors shown in a closed position.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

Direction of rotation, either clockwise or counterclockwise, as used herein is taken from a position above the axis of interest unless clearly indicated otherwise. In the present disclosure, clockwise rotation or counterclockwise rotation about a vertical axis is from a reference above the axis looking down the axis.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
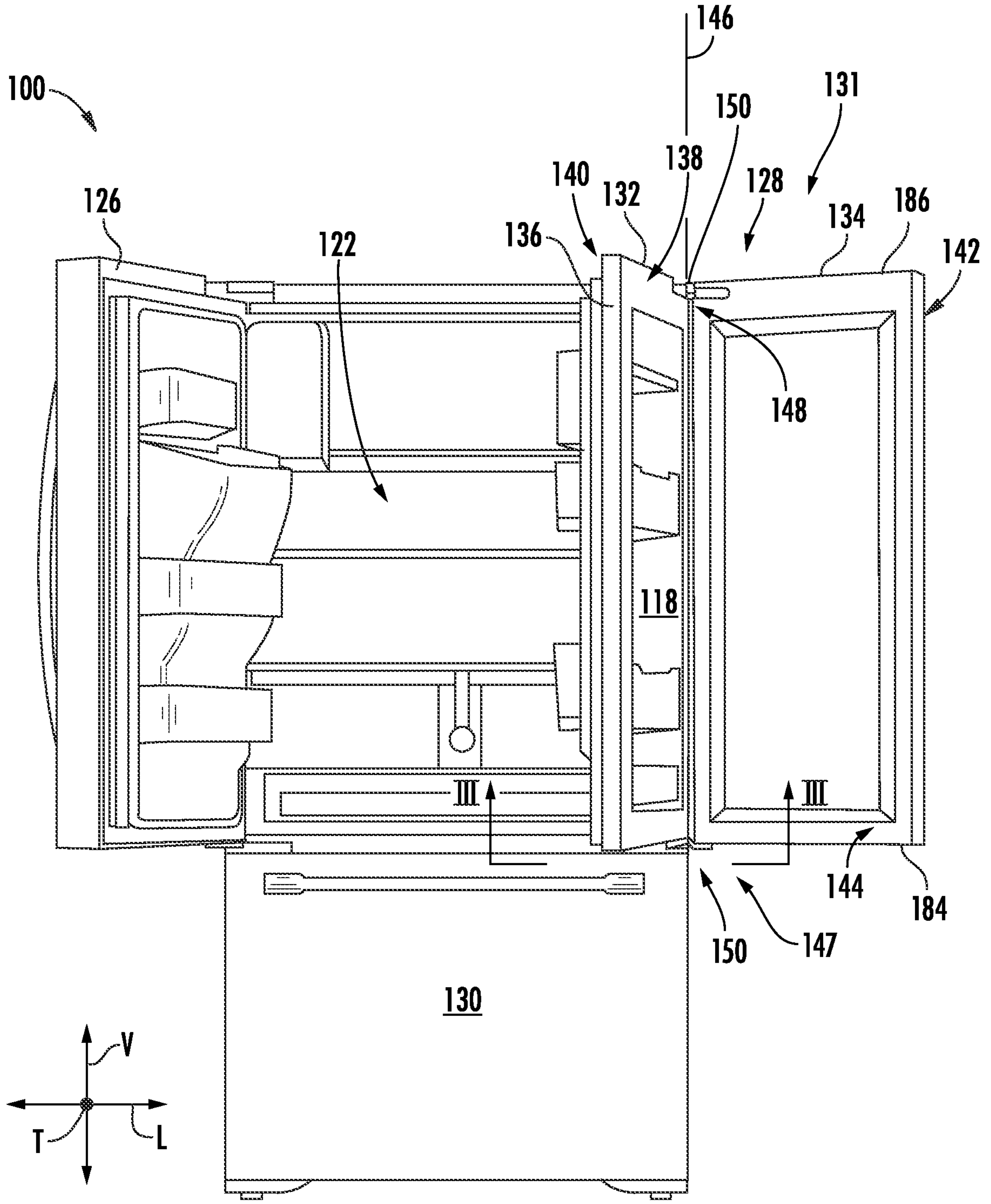
FIG. 2 provides a front elevation view of the refrigerator appliance of FIG. 1 with refrigerator doors shown in an open position.

FIG. 1 provides a perspective view of a refrigerator appliance 100 according to exemplary embodiments of the present subject matter. FIG. 2 provides a front elevation view thereof with fresh food compartment doors shown in an open position. As shown in FIG. 1, refrigerator appliance 100 includes a cabinet 120 that extends between a top 101 and a bottom 102 along a vertical direction V. Cabinet 120 also extends between a first (left) side 104 and a second (right) side 106 along a lateral direction L and between a front 108 and a rear 110 along a transverse direction T. Vertical direction V, lateral direction L, and transverse direction T are mutually perpendicular and form an orthogonal direction system.

Cabinet 120 defines chilled chambers for receipt of food items for storage, a front portion of the chamber 122 defining an opening. In particular, cabinet 120 defines a fresh food chamber 122 positioned at or adjacent top 101 of cabinet 120 and a freezer chamber 124 arranged at or adjacent bottom 102 of cabinet 120. As such, refrigerator appliance 100 is generally referred to as a bottom mount refrigerator. It is recognized, however, that the benefits of the present disclosure matter apply to other types and styles of refrigerator appliances, such as e.g., top mount refrigerator appliances, side-by-side style refrigerator appliances, and wine storage refrigerators. Moreover, the benefits of the present disclosure matter may likewise apply to freezer appliances, e.g., upright freezers. In addition, the teachings of the present disclosure may also apply to other types of appliances, including e.g., microwaves, dryers, washing machines, etc. Consequently, the description set forth herein is for exemplary purposes only and is not intended to be limiting in any aspect to any particular type of consumer appliance.

For this embodiment, refrigerator doors 126, 128 are configured in a French door configuration and are rotatably hinged or mounted to an edge of cabinet 120 for selectively accessing fresh food chamber 122. Refrigerator door 126 (i.e., left door) is rotatably mounted or hinged to cabinet 120 at first side 104 of cabinet 120. Refrigerator door 128 (i.e., right door) is rotatably mounted or hinged to cabinet 120 at second side 106 of cabinet 120. More specifically, refrigerator door 128 is rotatably mounted to cabinet 120 via hinge assembly 150 (FIG. 2). In FIG. 1, refrigerator doors 126, 128 are shown in a closed position. In FIG. 2, refrigerator doors 126, 128 are shown in an open position.

As shown in FIG. 2, refrigerator door 128 comprises a door-in-door refrigerator appliance door assembly 131. As such, refrigerator door 128 includes inner door, or inner door 132, and an outer door 134, both of which are shown in an open position in FIG. 2. In other embodiments, refrigerator door 126 can likewise have a door-in-door configuration. In this way, one or both of refrigerator doors 126, 128 can have door-in-door configurations. As illustrated and discussed in the present disclosure, the right-side refrigerator door, door 128, for fresh food chamber 122 is used to illustrate features of the present disclosure. In particular, figures provided will be of the bottom hinge 147 of right side door 128, with views generally taken along III-III of FIG. 2 unless otherwise specified. This is for convenience only as one of ordinary skill in the art will recognize that the disclosed features can be applied to other door locations, such as top hinge 148 (adjacent top 101 of refrigerator appliance 100) of door 126, or either the top or the bottom hinge of door 126 when configured as a door-in-door assembly. Accordingly, illustrations and discussions of the right-side door-in-door arrangement is for illustration only and not intended to be limiting.

Inner door 132 comprises an outer surface 138 and an opposing inner surface 140 that faces toward fresh food chamber 122 when inner door 132 is in a closed position. Inner door 132 is rotatably hinged or mounted to cabinet 120, e.g., such that inner door 132 is movable between a closed position (FIG. 1) and an open position (FIG. 2) to permit selective access to fresh food chamber 122. In particular, inner door 132 can be rotatably coupled or mounted directly to cabinet 120 at the second side 106 of cabinet 120 via hinge assembly 150. Specifically, inner door 132 is rotatably mounted about pivot axis 146 to first end of cabinet plate 152, with the second end 154 of cabinet plate 152 forming a mounting surface to fixedly mount the cabinet plate 152 to the cabinet 120. Inner door 132 defines an opening extending through the outer and inner surfaces 138, 140 and into fresh food chamber 122. Inner door 132 forms a storage area 118, for example a food storage area, located in the door-in-door assembly 131. Portions of inner door 132 can extend into the fresh food chamber 122 when inner door 132 is in the closed position.

Outer door 134 includes an outer surface 142 and an opposing inner surface 144. The outer surface 142 faces away from the refrigerator appliance 100 and inner surface 144 faces toward fresh food chamber 122 or toward the interior of refrigerator appliance 100 when outer door 134 is in the closed position. As shown, outer door 134 is rotatably coupled or hinged to inner door 132 via components of hinge assembly 150. In particular in the present embodiment, inner door 132 and outer door 134 are both rotatably coupled with hinge assembly 150. In this way, door-in-door assembly 131 (including inner door 132 and outer door 134) is directly rotatably coupled with cabinet 120 of refrigerator appliance 100 via hinge assembly 150. Outer door 134 is movable (rotatable) with respect to the inner door 132 and cabinet 120 between a closed position (FIG. 1) and an open position (FIG. 2). In some embodiments, outer door 134 is movable to permit selective access to a portion of fresh food chamber 122 through the opening defined by inner door 132. In some embodiments, outer door 134 permits selective access to a storage area 118 formed in the door-in-door assembly 131.

Inner and outer doors 132, 134 can generally move (rotate) about a common axis, axis 146. Specifically, inner and outer doors 132, 134 can each move away or swing out from fresh food chamber 122 of refrigerator appliance 100 when moving towards respective open positions or the fully open positions for each door 132, 134. Moreover, inner and outer doors 132, 134 can each move toward fresh food chamber 122 of refrigerator appliance 100 when moving toward their respective closed positions. As illustrated, door assembly 131 (i.e., inner and outer doors 132, 134 mounted at the second (right) side 106 of the cabinet 120) rotate about an axis 146 in a clockwise direction (when viewed vertically downward along axis 146) to close the doors 132, 134. Similarly, inner and outer doors rotate in a counterclockwise direction to an open position (FIG. 2) with counterclockwise rotation arrested for each door with door stops (discussed below). The rotation angle of the outer door 134 and the inner door 132 is taken from a reference position of both doors 132, 134 in the closed position (FIG. 1) corresponding to zero degrees of rotation. The doors 132, 134 may rotate from the closed position to a maximum rotation angle or any position between zero degrees and the maximum rotation angle.

In embodiments, the maximum rotation angle of the inner door is greater than the maximum rotation of the outer door. For example, the maximum rotation angle of the inner door, measured as described above, may be between about 0 degrees and about 145 degrees, or about 0 degrees and about 135 degrees, or between about 0 degrees and about 125 degrees. According to some embodiments, the maximum rotation angle for the inner door is about 125 degrees to provide full width or substantially full width access to the refrigerated chamber 122. In embodiments, when the inner door 132 and outer door 134 are closed and secured together, the full door (inner and outer door 132, 134 coupled together) maximum rotation angle is the same, or substantially the same, as the maximum inner door rotation angle.

Measured in a similar manner, the maximum rotation angle for the outer door 134 about the common axis 146 is between about 0 degrees and 135 degrees, or between about 0 degrees and about 125 degrees, or between about 0 degrees and 107 degrees. According to some embodiments, the maximum rotation angle for the outer door is about 107 degrees to prevent or substantially prevent impact between the outer door 134 and the inner door 132.

In some embodiments, refrigerator appliance 100 includes a gasket positioned on inner surface 144 of outer door 134. As outer door 134 moves toward the closed position, outer door 134 can compress the gasket against outer surface 138 of inner door 132. Specifically, the gasket may seal against outer surface 138 of inner door 132 to enclose fresh food chamber 122. In alternative embodiments, the gasket can be positioned on outer surface 138 of inner door 132, and as outer door 134 moves toward the closed position, inner door 132 can compress the gasket against inner surface 144 of outer door 134. More specifically, the gasket can seal against inner surface 144 of outer door 134. It should be appreciated that the gasket can be formed of any suitable material. For example, in some embodiments, the gasket can be formed of a resilient rubber or plastic material.

As further shown in FIGS. 1 and 2, a freezer door 130 is arranged below refrigerator doors 126, 128 for selectively accessing freezer chamber 124 (FIG. 1). Although freezer door 130 is configured as a pull-out drawer in FIG. 1, in other exemplary embodiments, refrigerator appliance 100 can include one or more freezer doors that are rotatably hinged or mounted to housing 102 in the same or similar fashion as refrigerator doors 126, 128.

Figure 3:
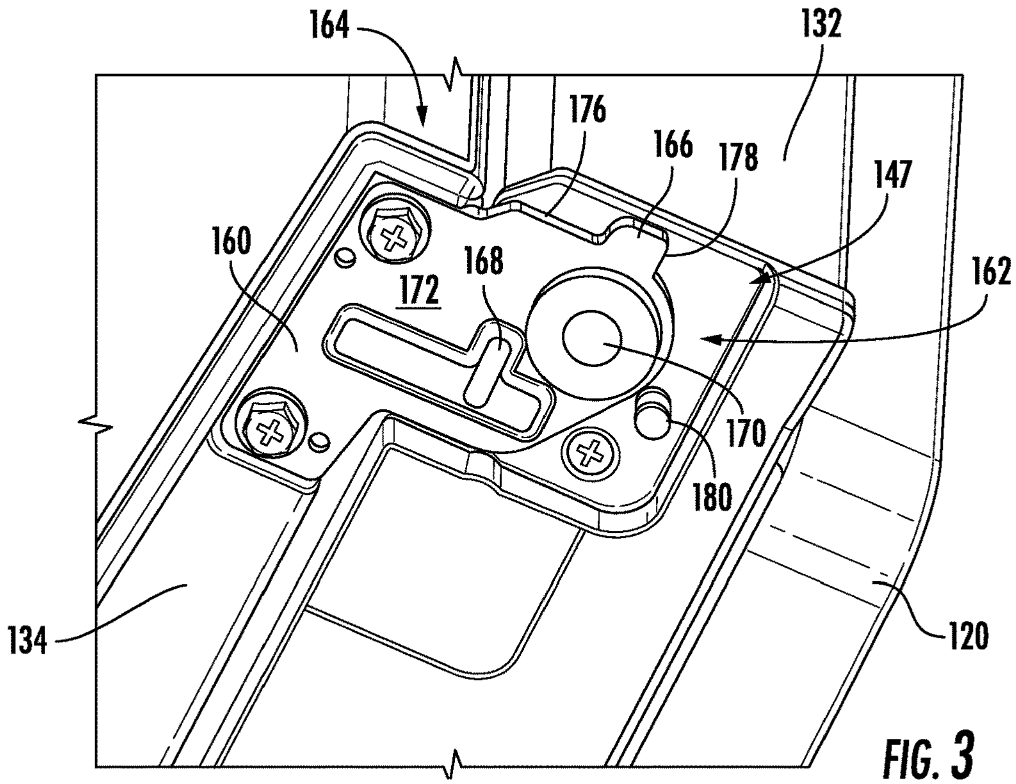
FIG. 3 provides a bottom view taken along III-III of FIG. 2 of a hinge assembly according to embodiments of the present disclosure.
Figure 4:
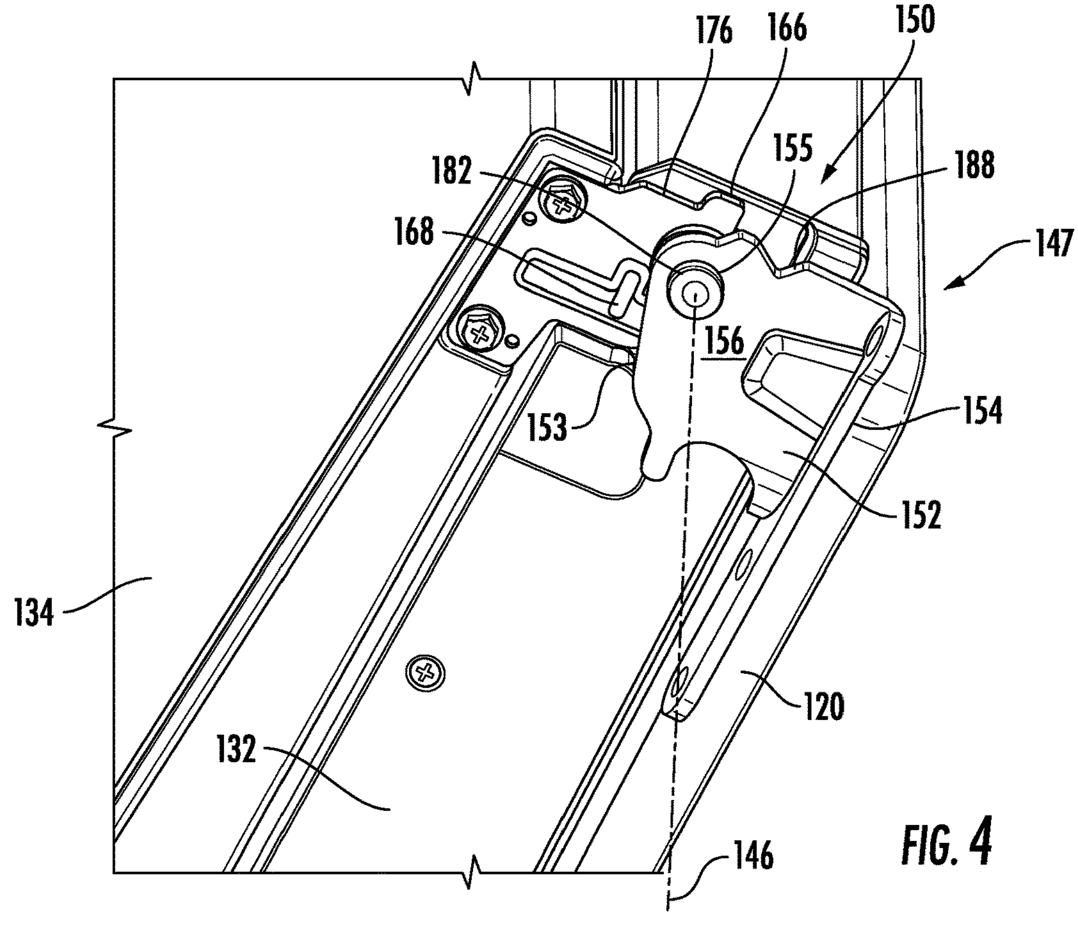
FIG. 4 provides an alternate view of the hinge assembly of FIG. 3.

FIGS. 3 and 4 illustrate a bottom hinge 147 mounted at a lower portion 136 of refrigerator door 128. In the exemplary embodiment, door 128 includes a door-in-door assembly 131 with bottom hinge 147 supporting the door-in-door assembly in rotation about a common axis 146. FIG. 4 illustrates the hinge assembly 150 and FIG. 3 represents the hinge assembly 150 with the cabinet plate 152 removed for clarity.

Figure 5:
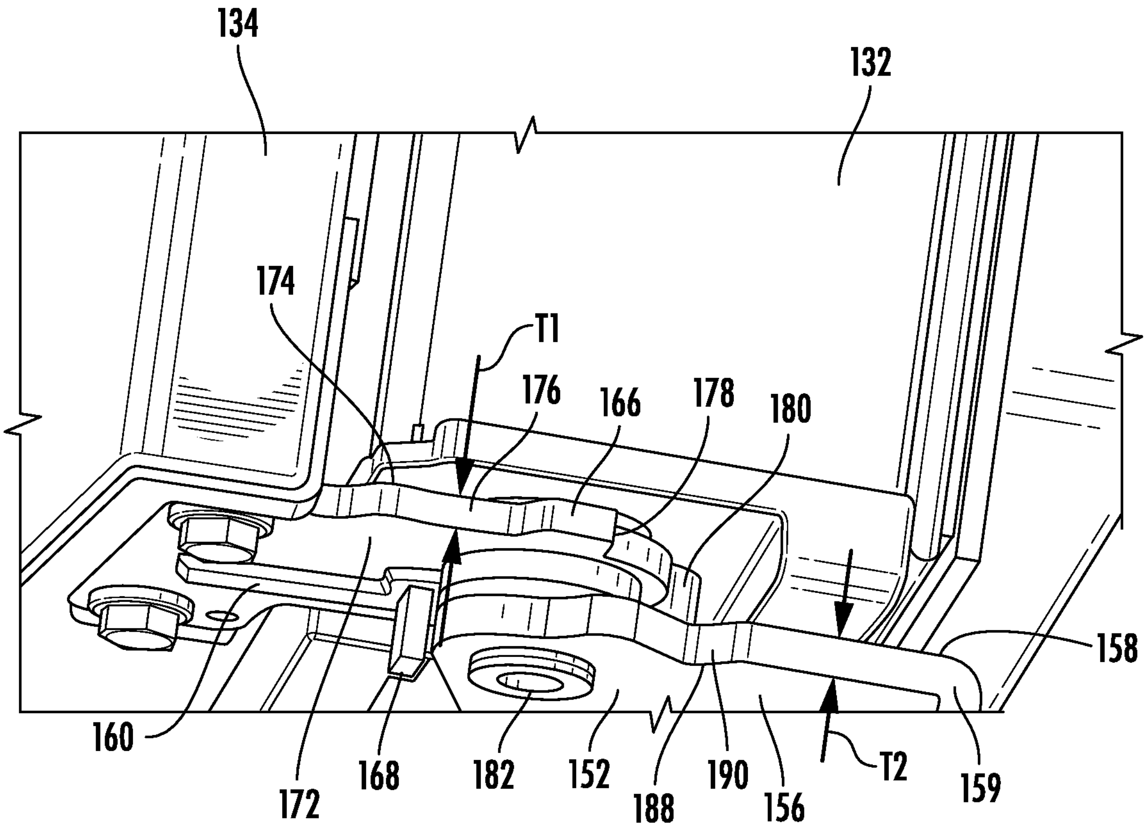
FIG. 5 provides an enlarged side view of the hinge assembly of FIG. 4.

Beginning with FIG. 3, second end 164 of door plate 160 comprises a mounting surface to fixedly mount the cabinet plate 152 to the outer door 134, for example with threaded fasteners as illustrated. In other embodiments, other attachments may be used, such as rivets or welding. Door plate 160 comprises a first surface 172 spaced from generally parallel second surface 174 (FIG. 5), the first and second surfaces 172, 174 defining a thickness T1. First end 162, opposite second end 164, defines a second aperture 170 formed through the thickness T1 of the door plate 160. The door plate is rotatably mounted to the inner door 132 about the pivot axis 146, the pivot axis 146 passing through second aperture 170.

A protruding feature, first tab 166, extends from the edge 176 of the door plate (i.e., from thickness T1) at first end 162, generally aligned with first and second surfaces 172, 174. First tab 166 comprises a contact face 178 proximate to the first end 162, the contact face 178 configured to contact and abut a first stop, for example stop pin 180, at the maximum outer door rotation angle. Stop pin 180 may be a protrusion formed on the bottom door edge 184 of the inner door 132. Stop pin 180 is shown and described as a cylindrical pin for ease of illustration and discussion with the understanding that that the stop pin 180 may be any shape suitable to engage contact face 178 and arrest rotation of door plate 160 (and outer door 134) at a maximum rotation angle. In embodiments in which the disclosed hinge assembly 150 is disposed on top door edge 186 of the inner door 132, the stop pin 180 may be formed with similar, or substantially similar, details on the top door edge 186 of inner door 132.

From the closed position for the full door as illustrated in FIGS. 3 and 4, outer door 134 (and attached door plate 160) may rotate about pivot axis 146 in a counterclockwise direction (viewed downwardly along axis 146) to an open position (FIG. 2). As the door plate 160 rotates, contact face 178 also rotates and approaches stop pin 180. At a maximum rotation of outer door 134 with respect to the inner door 132, contact face 178 abuts the stop pin 180, blocking further rotation of the outer door 134 with respect to inner door 132. Further rotation of outer door 134 about axis 146 with contact face 178 engaged with stop pin 180 applies a rotational force (torque) about axis 146 and may initiate a rotation of inner door 132. As such, the outer door 134 and inner door 132 will rotate together about axis 146.

Door plate 160 also comprises a second tab 168 formed on first surface 172. Second tab 168 is protruding feature on the door plate 160, generally perpendicular to the first surface 172. The second tab 168 may be a protrusion formed from the door plate 160, for example by disrupting a portion of the thickness T2 to stand proud of the undisturbed first surface 172. In other embodiments, the second tab 168 may be added to the door plate 160, for example by welding. The second tab 168 is configured to interact with a portion of the cabinet plate 152 (i.e., notch 188) as will be described below.

As illustrated in FIG. 4, the cabinet plate 152 comprises a first end 153 and a second end 154, the second end 1054 configured for fixed attachment to the cabinet 120. The cabinet plate 152 further comprises a first surface 156 spaced from and generally parallel to second surface 158, surfaces 156, 158 defining a thickness T2 and edge 159. A second stop, notch 188, is formed at the edge 159 of the cabinet plate 152. The first end 153 of cabinet plate 152 defines a first aperture 155 formed through the thickness T2. The first aperture 155 and second aperture 170 are formed to accept pivot 182 when the apertures 155, 170 are axially aligned. When assembled as hinge assembly 150, pivot 182 passes through first and second apertures 155, 170, allowing rotation of the cabinet plate 152 and door plate 160 about the axis 146.

Figure 6:
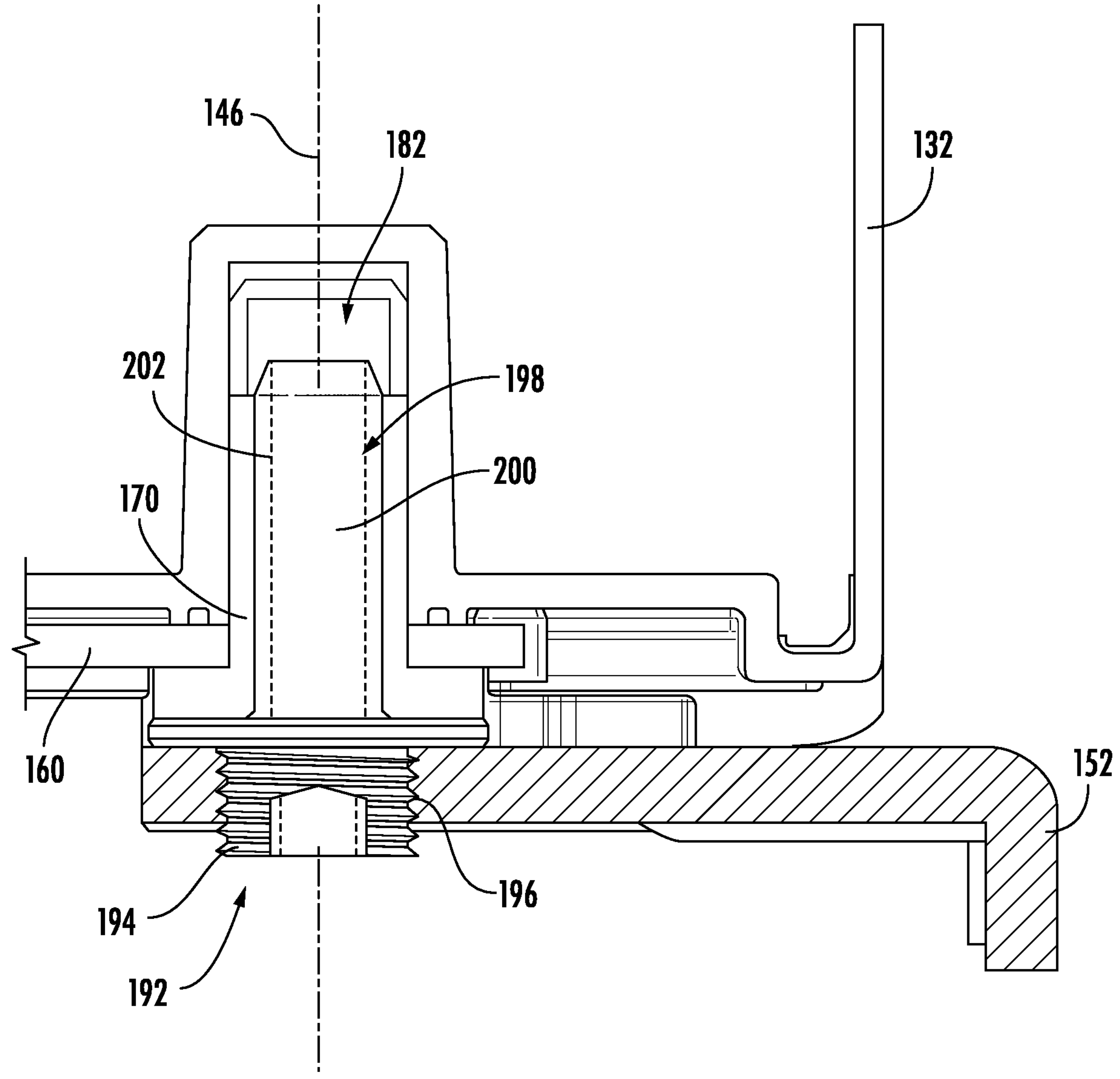
FIG. 6 provides a sectional view of the hinge assembly of FIG. 5.

As may be best illustrated in FIG. 6, according to an embodiment, the pivot 182 comprises an adjustment portion 192 that may facilitate alignment of the door-in-door assembly with the cabinet 120. The adjustment portion 192 comprising a threaded section 194 configured to engage a threaded section 196 of the cabinet plate 152. In particular, the threaded section 196 of the cabinet plate 152 may be the first aperture 155. Accordingly, in an embodiment, the pivot 182 may include an externally threaded section 194 and the first aperture 155 in cabinet plate 152 may have a complementary internally threaded section 196. The pivot portion 198 includes a radial outer bearing surface 200 configured to be received in the second aperture 170 and support rotation about axis 146. In some embodiments, the pivot 182 may comprise a central passage 202 extending for a portion of the length of the pivot 182. In some embodiments, the central passage 202 extends for the length of the pivot 182.

As may be best described with reference to FIG. 4, when door-in-door assembly 131 rotates as a full door about axis 146, door plate 160 rotates with the full door. Notably, outer door 134 and inner door 132 are latched together and rotating as one. As the door plate 160 rotates, first tab 166 advances toward the notch 188. The notch 188 in configured to receive the first tab 166 against bearing surface 190. The interaction of first tab 166 and notch 188 (i.e., bearing surface 190) arrests further rotation of the full door about axis 146.

The door-in-door common axis hinge assembly presented above is described and illustrated with respect to a bottom freezer, French door refrigerator appliance. Further, the disclosed hinge assembly is described at a particular location on a refrigerator appliance. In particular, the disclosure presents a hinge assembly mounted proximate to the lower right corner of a fresh food chamber and to the lower right corner of a right-hand door-in-door assembly. The appliance type and location of the hinge was chosen for a compact description and ease of illustration. As one of ordinary skill in the art would understand, the disclosed hinge assembly could be used with other types, designs, or styles of appliances. For example, the disclosed hinge may be employed on a single door refrigerator, a side-by side refrigerator/freezer, or on a freezer door.

Further, one of ordinary skill in the art will understand the disclosed hinge may be used at other locations of an appliance to mount a similar door-in-door assembly. For example, the disclosed hinge assembly may be applied proximate to the upper or lower corners of appliance doors to achieve the disclosed benefits. Accordingly, use of the disclosed with the described appliance and location is provided as an example and not a limitation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A refrigerator appliance defining a vertical direction, a lateral direction, and a transverse direction, the vertical, lateral, and transverse directions being mutually perpendicular, the refrigerator appliance comprising:

a cabinet defining a fresh food storage chamber, a front portion of the fresh food storage chamber defining an opening; and a door-in-door assembly mounted at the front portion of the fresh food storage chamber, the door-in-door assembly comprising:

an inner door including a first stop protruding from a door edge;

an outer door; and a hinge assembly comprising:

a cabinet plate comprising a first surface and a second surface defining a thickness, a first end defining a first aperture through the thickness, and a second end fixedly mounted to the cabinet;

a door plate comprising a first surface and a second surface defining a thickness, a first end defining a second aperture through the thickness, and a second end fixedly mounted to the outer door; and wherein the inner door is rotatably mounted to the cabinet plate about a pivot axis and the door plate is rotatably mounted to the inner door about the pivot axis, a pivot passing through the first and second apertures; and further wherein a first tab of the door plate abuts the first stop on the inner door at a maximum outer door rotation angle; and a second tab of the door plate abuts a second stop on the cabinet plate at a maximum inner door rotation angle.

2. The refrigerator appliance of claim 1, wherein the first tab comprises a protrusion extending from an edge of the door plate.

3. The refrigerator appliance of claim 2, wherein the protrusion extends from the door plate generally parallel to the first and second surfaces of the door plate.

4. The refrigerator appliance of claim 1, wherein the first stop is a stop pin extending generally vertically from a bottom door edge or a top door edge of the inner door.

5. The refrigerator appliance of claim 1, wherein the second tab comprises a protrusion extending generally perpendicular to the first surface of the door plate.

6. The refrigerator appliance of claim 1, wherein the second stop comprises a notch on the cabinet plate.

7. The refrigerator appliance of claim 6, wherein the second stop comprises a surface on the cabinet plate.

8. The refrigerator appliance of claim 1, wherein the maximum inner door rotation angle is greater than the maximum outer door rotation angle.

9. The refrigerator appliance of claim 8, wherein the maximum inner door rotation angle includes the outer door rotating with the inner door.

10. The refrigerator appliance of claim 8, wherein the maximum inner door rotation angle is substantially 125 degrees.

11. The refrigerator appliance of claim 8, wherein the maximum outer door rotation angle is substantially 107 degrees.

12. The refrigerator appliance of claim 1, wherein:

the pivot comprises a pin comprising a radial outer bearing surface; and wherein the first aperture and the second aperture are axially aligned and configured to receive the pin.

13. The refrigerator appliance of claim 1, wherein the pivot extends into a portion of the inner door.

14. The refrigerator appliance of claim 1, wherein the hinge assembly is positioned proximate to a lower portion of the door-in-door assembly.

* * * * *